United States Patent
Nishikawa et al.

(10) Patent No.: US 10,449,698 B2
(45) Date of Patent: Oct. 22, 2019

(54) BONDED STRUCTURE AND METHOD FOR PRODUCING BONDED STRUCTURE

(71) Applicant: OMRON Corporation, Kyoto (JP)

(72) Inventors: Kazuyoshi Nishikawa, Ritto (JP); Akio Sumiya, Kusatsu (JP); Satoshi Hirono, Kusatsu (JP); Tomoyuki Hakata, Uji (JP); Hiroshige Uematsu, Otsu (JP)

(73) Assignee: OMRON CORPORATION, Kyoto (JP)

( * ) Notice: Subject to any disclaimer, the term of this patent is extended or adjusted under 35 U.S.C. 154(b) by 120 days.

(21) Appl. No.: 15/504,160

(22) PCT Filed: Aug. 17, 2015

(86) PCT No.: PCT/JP2015/073040
§ 371 (c)(1),
(2) Date: Feb. 15, 2017

(87) PCT Pub. No.: WO2016/027775
PCT Pub. Date: Feb. 25, 2016

(65) Prior Publication Data
US 2017/0259468 A1  Sep. 14, 2017

(30) Foreign Application Priority Data

Aug. 22, 2014 (JP) ................................ 2014-169278
Mar. 9, 2015 (JP) ................................ 2015-046305

(51) Int. Cl.
*B29C 37/00* (2006.01)
*B29C 45/14* (2006.01)
(Continued)

(52) U.S. Cl.
CPC ...... *B29C 37/0085* (2013.01); *B23K 26/0006* (2013.01); *B23K 26/352* (2015.10);
(Continued)

(58) Field of Classification Search
CPC ..... Y10T 428/24521; B32B 3/30; B32B 7/04; B32B 15/08; B29C 45/14;
(Continued)

(56) References Cited

U.S. PATENT DOCUMENTS

| 2003/0116276 A1 | 6/2003 | Weldon et al. |
| 2008/0030876 A1 | 2/2008 | Kataoka et al. |

(Continued)

FOREIGN PATENT DOCUMENTS

| CN | 102712136 | 10/2012 |
| CN | 103946005 | 7/2014 |

(Continued)

OTHER PUBLICATIONS

Notification of Reasons for Refusal dated May 8, 2018 in corresponding Japanese Patent Application No. 2016-544197 with English Translation.

(Continued)

*Primary Examiner* — Catherine A. Simone
(74) *Attorney, Agent, or Firm* — Wenderoth, Lind & Ponack, L.L.P.

(57) ABSTRACT

A bonded structure is made of a first member and a second member which are bonded to each other. At least one bore having an opening is formed in a surface of the first member, and the second member is filled in the bore of the first member. The bore is defined by a diameter-increasing portion whose opening size increases in a depth direction from a surface side toward a bottom of the first member, and a first diameter-decreasing portion whose opening size decreases in the depth direction from the surface side toward the bottom. The diameter-increasing portion is formed on the surface side, and the first diameter-decreasing portion is formed on a bottom side.

7 Claims, 10 Drawing Sheets

(51) Int. Cl.
| | |
|---|---|
| *B32B 3/30* | (2006.01) |
| *B32B 7/04* | (2019.01) |
| *B32B 15/08* | (2006.01) |
| *B23K 26/352* | (2014.01) |
| *B23K 26/00* | (2014.01) |
| *B29C 65/06* | (2006.01) |
| *B29C 65/08* | (2006.01) |
| *B29C 65/16* | (2006.01) |
| *B29C 65/18* | (2006.01) |
| *B29C 65/00* | (2006.01) |
| *B23K 103/02* | (2006.01) |
| *B23K 103/04* | (2006.01) |
| *B23K 103/10* | (2006.01) |
| *B23K 103/12* | (2006.01) |
| *B23K 103/08* | (2006.01) |
| *B23K 26/384* | (2014.01) |
| *B29C 65/20* | (2006.01) |
| *B23K 26/382* | (2014.01) |

(52) U.S. Cl.
CPC .......... *B23K 26/355* (2018.08); *B29C 45/14* (2013.01); *B29C 45/14311* (2013.01); *B29C 65/06* (2013.01); *B29C 65/08* (2013.01); *B29C 65/16* (2013.01); *B29C 65/18* (2013.01); *B29C 66/0246* (2013.01); *B29C 66/7392* (2013.01); *B29C 66/7394* (2013.01); *B29C 66/742* (2013.01); *B32B 3/30* (2013.01); *B32B 7/04* (2013.01); *B32B 15/08* (2013.01); *B23K 26/384* (2015.10); *B23K 26/389* (2015.10); *B23K 2103/02* (2018.08); *B23K 2103/05* (2018.08); *B23K 2103/10* (2018.08); *B23K 2103/12* (2018.08); *B23K 2103/15* (2018.08); *B29C 65/20* (2013.01); *B29C 66/1122* (2013.01); *B29C 66/30325* (2013.01); *B29C 66/41* (2013.01); *B29C 66/73921* (2013.01); *B29C 66/73941* (2013.01); *B29C 66/7422* (2013.01); *B29C 66/74281* (2013.01); *B29C 66/74283* (2013.01); *B29C 2045/14327* (2013.01); *B29C 2791/009* (2013.01)

(58) Field of Classification Search
CPC . B29C 45/14311; B29C 66/74; B29C 66/742; B29C 2045/14327; B29C 37/0085
USPC ......................................................... 428/161
See application file for complete search history.

(56) References Cited

U.S. PATENT DOCUMENTS

| | | | |
|---|---|---|---|
| 2008/0070001 | A1 | 3/2008 | Lasarov et al. |
| 2009/0017242 | A1 | 1/2009 | Weber et al. |
| 2010/0079970 | A1 | 4/2010 | Prest et al. |
| 2011/0217512 | A1 | 9/2011 | Heishi et al. |
| 2013/0078423 | A1 | 3/2013 | Sutou et al. |
| 2014/0272310 | A1* | 9/2014 | Lazur .................... B05D 3/002 428/164 |
| 2014/0305914 | A1 | 10/2014 | Sutou et al. |
| 2016/0151993 | A1 | 6/2016 | Ikeda et al. |

FOREIGN PATENT DOCUMENTS

| | | |
|---|---|---|
| EP | 0 626 228 | 11/1994 |
| JP | 60-248337 | 12/1985 |
| JP | 7-148584 | 6/1995 |
| JP | 2005-532242 | 10/2005 |
| JP | 2006-012507 | 1/2006 |
| JP | 2007-507358 | 3/2007 |
| JP | 2007-105777 | 4/2007 |
| JP | 4020957 | 12/2007 |
| JP | 2009-226643 | 10/2009 |
| JP | 2011-143539 | 7/2011 |
| JP | 2012-232314 | 11/2012 |
| JP | 2013-038674 | 2/2013 |
| JP | 2013-071312 | 4/2013 |
| JP | 2013-107273 | 6/2013 |
| JP | 2013-129177 | 7/2013 |
| JP | 2014-018995 | 2/2014 |
| JP | 2014-065288 | 4/2014 |
| JP | 2014-166693 | 9/2014 |
| JP | 2015-100959 | 6/2015 |
| WO | 2010/024391 | 3/2010 |
| WO | 2015/008771 | 1/2015 |

OTHER PUBLICATIONS

The Notification of Second Office Action dated Mar. 9, 2018 in corresponding Chinese Patent Application No. 201510492703.5 with English Translation.
Chinese Office Action dated Feb. 27, 2018 in corresponding Chinese Application No. 201580044632.0, with English translation.
International Search Report dated Oct. 27, 2015 in International (PCT) Application No. PCT/JP2015/073040.
Extended European Search Report dated Jul. 31, 2017 in corresponding European Application No. 15833480.5.
Chinese Office Action dated Mar. 28, 2019 in corresponding Chinese Patent Application No. 201580044632.0 with English translation.
Korean Office Action dated Jan. 2, 2019 in corresponding Korean Patent Application No. 10-2017-7003223 with English translation.

* cited by examiner

BONDED STRUCTURE AND METHOD FOR PRODUCING BONDED STRUCTURE

TECHNICAL FIELD

The present invention relates to a bonded structure and a method for producing the bonded structure.

BACKGROUND ART

In a conventional bonded structure, a first member and a second member, composed of dissimilar materials, are bonded to each other (for example, see PTL 1).

PTL 1 discloses a technique for bonding a metal material with a dissimilar material such as a resin. Specifically, the surface of a metal material is processed by laser scanning in a crossing pattern such that a multiplicity of protrusions (bumps and dents) are formed on the surface. When the dissimilar material is bonded on the metal material provided with such protrusions, the dissimilar material fills the dents, which triggers an anchor effect and improves the bonding strength between the metal material and the dissimilar material.

CITATION LIST

Patent Literature

[PTL 1] JP 4020957 B2

SUMMARY OF INVENTION

Technical Problem

As mentioned above, the conventional technique can improve the bonding strength in shear directions (directions moving along the bonding surface) by forming protrusions on the surface of the metal material and allowing the dissimilar material to fill the dents. However, it is difficult to improve the bonding strength in peel directions (directions perpendicular to the bonding interface).

The present invention has been made to solve the above problem. It is an object of the present invention to provide a bonded structure and a method for producing the bonded structure, which can improve the bonding strength not only in shear directions but also in peel directions.

Solution to Problem

A bonded structure according to the present invention relates to a bonded structure including a first member and a second member which are bonded to each other. At least one bore having an opening is formed in a surface of the first member, and the second member is filled in the bore of the first member. The bore is defined by a diameter-increasing portion whose opening size increases in a depth direction from a surface side toward a bottom of the first member, and a first diameter-decreasing portion whose opening size decreases in the depth direction from the surface side toward the bottom. The diameter-increasing portion is formed on the surface side, and the first diameter-decreasing portion is formed on a bottom side.

Owing to this configuration, the diameter-increasing portion projects inwardly in the bore and thus is engageable with the second member filled in the bore in peel directions, thereby improving the bonding strength in peel directions. Eventually, it is possible to improve the bonding strength not only in shear directions but also in peel directions.

In this bonded structure, the bore may be further defined by a second diameter-decreasing portion whose opening size decreases in the depth direction from the surface side toward the bottom, the second diameter-decreasing portion being formed on the surface side relative to the diameter-increasing portion.

In this bonded structure, the at least one bore may include a plurality of bores formed in the surface of the first member, and a gap between adjacent ones of the bores (a center-to-center distance) may be 200 µm or less.

In this bonded structure, the bore may have an opening size of 30 µm to 100 µm at the surface.

In this bonded structure, the bore may have a depth of 30 µm to 300 µm.

In this bonded structure, the first member may be a metal, a thermoplastic resin, or a thermosetting resin.

In this bonded structure, the second member may be a thermoplastic resin or a thermosetting resin.

In this bonded structure, a rib may be provided around the opening of the bore, in an upwardly rising manner from the surface.

In this bonded structure, an axis of the bore may be formed so as to incline to the surface.

In this bonded structure, the diameter-increasing portion and the first diameter-decreasing portion may be formed as a set in a continuous manner, and a plurality of sets of the diameter-increasing portion and the first diameter-decreasing portion may be formed in the depth direction.

A method for producing the bonded structure according to the present invention relates to a method for producing a bonded structure including a first member and a second member which are bonded to each other. The method includes the step for forming at least one bore having an opening in a surface of the first member, and the step for filling the second member in the bore of the first member and solidifying the second member therein. The bore is defined by a diameter-increasing portion whose opening size increases in a depth direction from a surface side toward a bottom of the first member, and a first diameter-decreasing portion whose opening size decreases in the depth direction from the surface side toward the bottom. The diameter-increasing portion is formed on the surface side, and the first diameter-decreasing portion is formed on a bottom side.

Owing to this configuration, the diameter-increasing portion projects inwardly in the bore and thus is engageable with the second member filled in the bore in peel directions, thereby improving the bonding strength in peel directions. Eventually, it is possible to improve the bonding strength not only in shear directions but also in peel directions.

In this method for producing the bonded structure, the first member may be a metal, and the bore may be formed by laser irradiation to the surface of the first member, in an inert gas atmosphere or a reduced-pressure atmosphere.

In this method for producing the bonded structure, the first member may be a metal, and the second member may be a thermoplastic resin or a thermosetting resin. The second member may be filled in the bore of the first member and solidified therein, in an inert gas atmosphere or a reduced-pressure atmosphere. In this context, the reduced-pressure atmosphere encompasses the case where the pressure is reduced from the atmospheric pressure and the case where the pressure is reduced after an inert gas is introduced.

Advantageous Effects of the Invention

The bonded structure and the method for producing the bonded structure according to the present invention can improve the bonding strength not only in shear directions but also in peel directions.

DESCRIPTION OF EMBODIMENTS

Hereinafter, embodiments of the present invention are described with reference to the drawings.

First Embodiment

To start with, a bonded structure 100 according to the first embodiment of the present invention is described with reference to FIG. 1.

Figure 1:
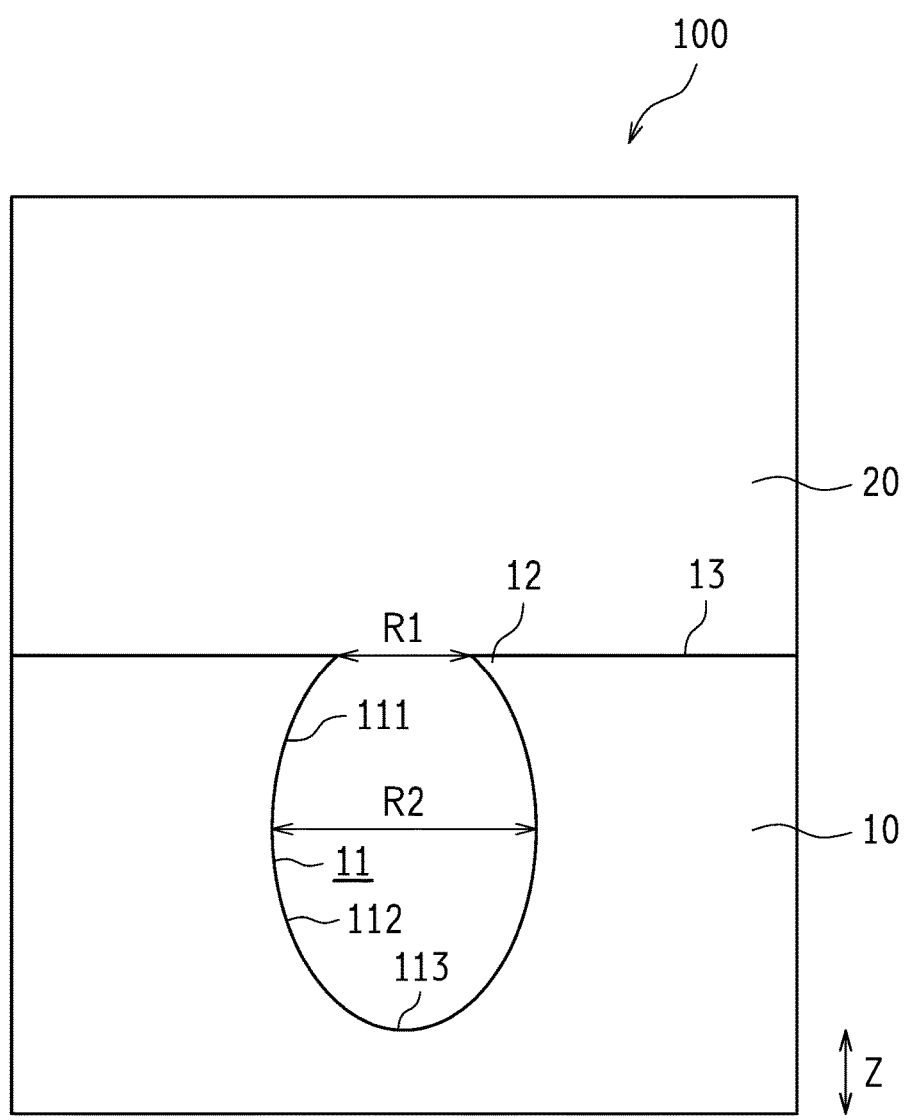
FIG. 1 is a schematic cross-sectional view of a bonded structure according to a first embodiment of the present invention.

As shown in FIG. 1, the bonded structure 100 is made of a first member 10 and a second member 20 which are composed of dissimilar materials and bonded to each other. A bore 11 having an opening is formed in a surface 13 of the first member 10. A projecting portion 12 is formed along an inner periphery of the bore 11 in an inwardly protruding manner. The second member 20 is filled in the bore 11 of the first member 10 and is solidified therein. Actually, a plurality of bores 11 are formed in the first member 10. However, being an enlarged schematic view which depicts a bonding interface between the first member 10 and the second member 20, FIG. 1 shows only one bore 11.

The material for the first member 10 is a metal, a thermoplastic resin, or a thermosetting resin. The materials for the second member 20 is a thermoplastic resin or a thermosetting resin.

Examples of the metal are ferrous metals, stainless metals, copper-based metals, aluminum-based metals, magnesium-based metals, and alloys thereof. The metal material may also be a molded metal product, manufactured by zinc die casting, aluminum die casting, powder metallurgy, or the like.

Examples of the thermoplastic resin are PVC (polyvinyl chloride), PS (polystyrene), AS (acrylonitrile-styrene), ABS (acrylonitrile-butadiene-styrene), PMMA (polymethyl methacrylate), PE (polyethylene), PP (polypropylene), PC (polycarbonate), m-PPE (modified polyphenylene ether), PA6 (polyamide 6), PA66 (polyamide 66), POM (polyacetal), PET (polyethylene terephthalate), PBT (polybutylene terephthalate), PSF (polysulfone), PAR (polyarylate), PEI (polyether imide), PPS (polyphenylene sulfide), PES (polyethersulfone), PEEK (polyether ether ketone), PAI (polyamide-imide), LCP (liquid crystal polymer), PVDC (polyvinylidene chloride), PTFE (polytetrafluoroethylene), PCTFE (polychlorotrifluoroethylene), and PVDF (polyvinylidene difluoride). The thermoplastic resin may also be TPE (thermoplastic elastomers) such as TPO (olefin thermoplastic elastomers), TPS (styrene thermoplastic elastomers), TPEE (ester thermoplastic elastomers), TPU (urethane thermoplastic elastomers), TPA (nylon thermoplastic elastomers), and TPVC (vinyl chloride thermoplastic elastomers).

Examples of the thermosetting resin are EP (epoxy), PUR (polyurethane), UF (urea formaldehyde), MF (melamine formaldehyde), PF (phenol formaldehyde), UP (unsaturated polyester), and SI (silicone). The thermosetting resin may also be FRP (fiber-reinforced plastics).

The above-mentioned thermoplastic resins and thermosetting resins may further contain a filler. Examples of the filler include inorganic fillers (glass fiber, inorganic salts, etc.), metallic fillers, organic fillers, carbon fibers, and the like.

The bores 11 are formed in the surface 13 of the first member 10, as blind holes having an approximately circular shape in plan view. Preferably, the bores 11 have an opening size R1 of from 30 μm to 100 μm at the surface 13. If the opening size R1 is smaller than 30 μm, the filling property of the second member 20 may get so worse as to reduce the anchor effect. If the opening size R1 is greater than 100 μm, the number of bores 11 per unit area will be so few that the anchor effect may be reduced and it will be difficult to form the projecting portions 12.

Preferably, the depth of the bores 11 is from 30 µm to 300 µm. If the depth of the bores 11 is less than 30 µm, it will be difficult to form the projecting portions 12. If the depth of bores 11 is greater than 300 µm, the opening size R1 is likely to be so small as to deteriorate the filling property of the second member 20. For the bores 11, the proportion of the depth to the opening size R1 (depth/opening size R1) is preferably between 0.3 and 10, and more preferably between 0.6 and 3.7.

Preferably, the gap between the bores 11 (the distance between the center of a certain bore 11 and the center of another bore 11 adjacent to the certain bore 11) is 200 µm or less. If the gap between the bores 11 is greater than 200 µm, the number of bores 11 per unit area may be so few that the anchor effect may be reduced. An example of the minimum gap between the bores 11 is such that the bores 11 do not overlap and join with each other. Preferably, the gap between the adjacent bores 11 (the center-to-center distance) is equal to or greater than the opening size R1 of the bores 11. It is also preferable that all the bores 11 are separated from each other by the same gap because the evenly spaced bores 11 ensure an isotropic bonding strength in the shear directions.

In the first embodiment, each of the bores 11 is defined, in a continuous manner, by a diameter-increasing portion 111 whose opening size increases in a depth direction (a Z direction) from a surface 13 side toward a bottom 113, and a diameter-decreasing portion 112 whose opening size decreases in the depth direction from the surface 13 side toward the bottom 113. The diameter-increasing portion 111 expands in a curved manner, and the diameter-decreasing portion 112 narrows in a curved manner. The diameter-decreasing portion 112 is an example of "a first diameter-decreasing portion" in the present invention.

The diameter-increasing portion 111 is arranged on the surface 13 side, and the diameter-decreasing portion 112 is arranged on the bottom 113 side. Hence, the greatest diameter in each bore 11 is an opening size (an inner diameter) R2 at a boundary between the diameter-increasing portion 111 and the diameter-decreasing portion 112, the opening size R1 being smaller than the opening size R2. Namely, in the depth direction in each bore 11, a part of the diameter-increasing portion 111 serves as the projecting portion 12. In other words, the diameter-increasing portion 111 constitutes the projecting portion 12. In this arrangement, the apex of the projecting portion 12 lies on the surface 13 of the first member 10. The projecting portion 12 is formed, for example, annularly along an entire periphery of each bore 11.

The projecting portion 12 (the diameter-increasing portion 111) which protrudes inwardly along the inner periphery of the bore 11 is engageable in peel directions (Z directions) with the second member 20 filled in the bore 11, so that the bonding strength in the peel directions can be improved. This configuration can improve the bonding strength not only in the shear directions but also in the peel directions. Besides, in a thermal cycling environment, the bonding strength can be maintained even if peel stress is generated due to a difference in coefficient of linear expansion between the first member 10 and the second member 20. Thus, it is possible to improve durability in the thermal cycling environment.

The bores 11 are formed, for example, by laser irradiation. Considering the pulse oscillation ability, the laser can be selected from a fiber laser, a YAG laser, a YVO$_4$ laser, a semiconductor laser, a carbon dioxide laser, and an excimer laser. Considering the laser wavelength, a preferable laser is a fiber laser, a YAG laser, a YAG laser (at the second harmonic), a YVO$_4$ laser, or a semiconductor laser. The laser output is set in consideration of the laser irradiation diameter, the material for the first member 10, the shape (e.g. thickness) of the first member 10, and the like. Preferably, the maximum laser output is, for example, 40 W. A laser output over 40 W is so powerful that it is difficult to form the bores 11 having the projecting portions 12.

An example of the device for forming the bores 11 is a fiber laser marker MX-Z2000 or MX-Z2050 manufactured by OMRON Corporation. Each of these fiber laser markers can emit a laser beam in which one pulse is composed of a plurality of subpulses. This type of fiber laser markers can easily focus the laser energy in the depth direction, thus being suitable for formation of the bores 11. Specifically, when the first member 10 is subjected to laser irradiation, the first member 10 is melted locally to form the bores 11. Since the laser beam is composed of a plurality of subpulses, the molten first member 10 is less likely to scatter around, and is more likely to deposit in the vicinity of the bores 11. As the formation of the bore 11 proceeds further, the molten first member 10 starts to deposit on the inner side of the bores 11 and eventually forms the projecting portions 12. The laser beam is emitted, for example, in a direction perpendicular to the surface 13, so that the axis of each bore 11 is perpendicular to the surface 13.

Regarding the processing conditions for the fiber laser marker, the subpulses preferably have a cycle of 15 ns or less. If one subpulse cycle exceeds 15 ns, the energy tends to diffuse by heat conduction, so that it will be difficult to form the bores 11 having the projecting portions 12. It should be noted that one subpulse cycle is the sum of one subpulse irradiation period and an interval between the end of this subpulse irradiation and the start of the next subpulse irradiation.

Regarding the processing conditions for the fiber laser marker, the number of subpulses per pulse is preferably not less than 2 and not more than 50. If the number of subpulses exceeds 50, the unit output of the subpulses is so small that it will be difficult to form the bores 11 having the projecting portions 12.

The second member 20 is bonded to the surface 13 of the first member 10 in which the bores 11 have been formed. The second member 20 is bonded to the first member 10, for example, by injection molding, hot-plate welding, laser welding, cast curing, ultrasonic welding, or vibration welding. In this manner, the second member 20 is filled in the bores 11 and solidified therein.

The above-described bonded structure 100 can be applied, for example, in bonding a resin cover (not shown) to a metal housing of a photoelectric sensor (not shown). In this case, the first member 10 is the metal housing, and the second member 20 is the resin cover.

—Method for Producing the Bonded Structure—

Figure 2:
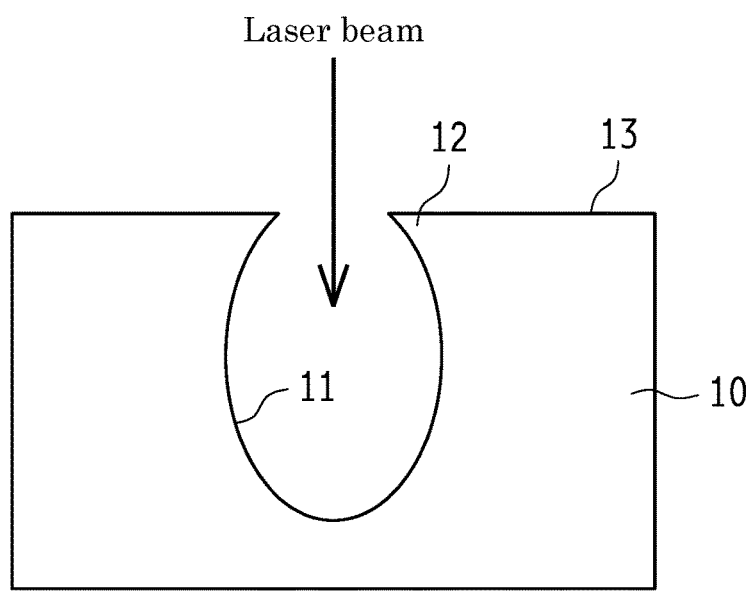
FIG. 2 is a schematic view of the bonded structure shown in FIG. 1, with a bore formed in a first member.

Next, a method for producing the bonded structure 100 according to the first embodiment is described with reference to FIG. 1 and FIG. 2.

To start with, the bores 11 are formed in the surface 13 of the first member 10, and the projecting portions 12 are formed along the inner peripheries of the bores 11. The bores 11 and the projecting portions 12 are formed by laser irradiation in which one pulse is composed of a plurality of subpulses, for example, as shown in FIG. 2. As a specific example, the fiber laser marker MX-Z2000 or MX-Z2050 mentioned above is employed to form the bores 11 and the projecting portions 12.

Thereafter, the second member 20 is filled into the bores 11 of the first member 10 and is solidified therein. By this process, the first member 10 and the second member 20 are bonded to each other to provide a bonded structure 100 (see FIG. 1). The second member 20 is bonded, for example, by injection molding, hot-plate welding, laser welding, cast curing, ultrasonic welding, or vibration welding.

—Modified Examples of the First Member—

Modified examples of the first member 10 are described with reference to FIG. 3 to FIG. 6.

Figure 3:
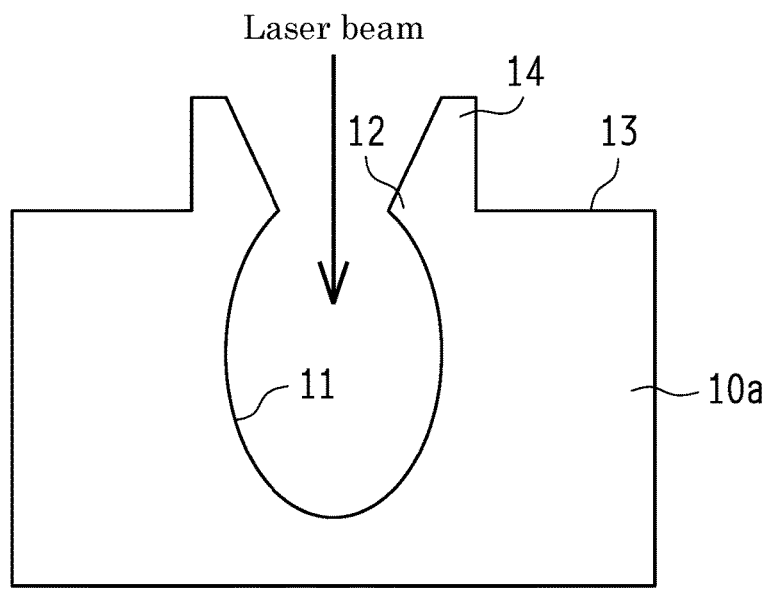
FIG. 3 is a schematic view of a first member in a first modified example of the first embodiment.

FIG. 3 is a schematic view of a first member 10*a* in a first modified example of the first embodiment. As shown in FIG. 3, the first member 10*a* may have a rib 14 rising upwardly from the surface 13 around the opening of each bore 11. The rib 14 surrounds the periphery of the bore 11, and has an approximately circular shape in plan view. When the first member 10*a* is irradiated with a laser beam in which one pulse is composed of a plurality of subpulses, the rib 14 is formed, for example, by deposition of the molten first member 10*a*. The rib 14 gives an additional anchor effect, and the resulting structure can improve the bonding strength further.

Figure 4:
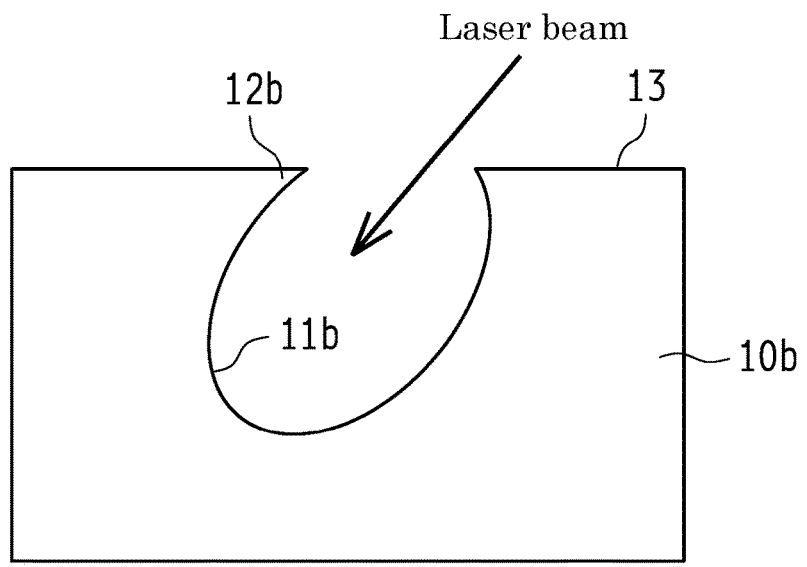
FIG. 4 is a schematic view of a first member in a second modified example of the first embodiment.

FIG. 4 is a schematic view of a first member 10*b* in a second modified example of the first embodiment. As shown in FIG. 4, the axis of each bore 11*b* in the first member 10*b* may be formed so as to incline to the surface 13. A projecting portion 12*b* which protrudes inwardly is formed along the inner periphery of the bore 11*b*. For example, to form the bore 11*b*, the laser irradiation direction is adjusted obliquely (by not less than 45° and not more than 90°) to the surface 13. Even if laser irradiation is obstructed by an object above the formation area of the bore 11*b*, this arrangement enables formation of the bore 11*b*.

Figure 5:
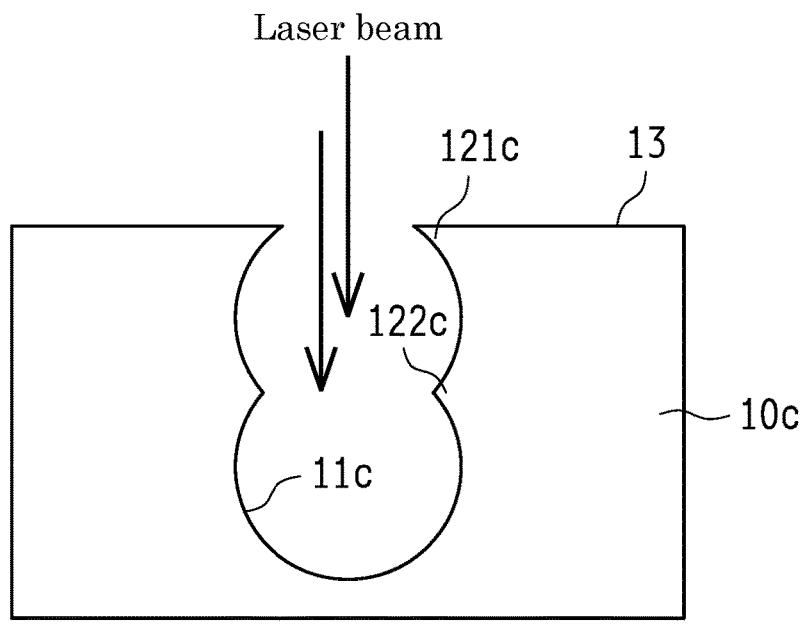
FIG. 5 is a schematic view of a first member in a third modified example of the first embodiment.

FIG. 5 is a schematic view of a first member 10*c* in a third modified example of the first embodiment. As shown in FIG. 5, the first member 10*c* may have a plurality of projecting portions 121*c* and 122*c* in each bore 11*c*. Namely, a set of the diameter-increasing portion and the diameter-decreasing portion are formed in a continuous manner as described above, and one or more additional sets of the diameter-increasing portion and the diameter-decreasing portion may be formed in the depth direction. The bore 11*c* can be formed, for example, by irradiating the same spot while changing the laser output conditions. This arrangement increases the surface area of the bore 11*c* and provides the plurality of projecting portions 121*c* and 122*c*, thereby improving the bonding strength to a greater extent. The example in FIG. 5 employs two projecting portions 121*c* and 122*c*, but there may be three or more projecting portions.

Figure 6:
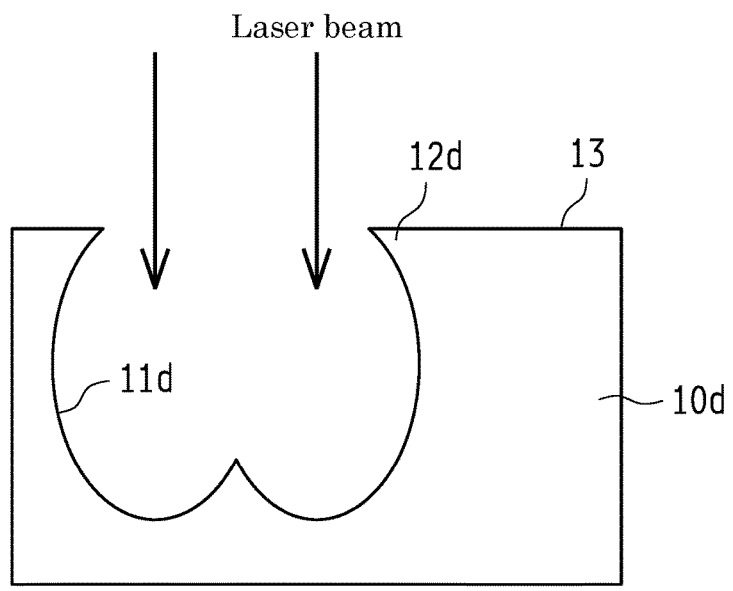
FIG. 6 is a schematic view of a first member in a fourth modified example of the first embodiment.

FIG. 6 is a schematic view of a first member 10*d* in a fourth modified example of the first embodiment. As shown in FIG. 6, a bore 11*d* in the first member 10*d* may be formed by more than one laser irradiation at different spots. Namely, bores formed by the laser irradiation are partially overlapped to constitute the bore 11*d*. A projecting portion 12*d* which protrudes inwardly is formed along the inner periphery of the bore 11*d*.

These first to fourth modified examples may be combined as required.

EXPERIMENTAL EXAMPLES

Figure 7:
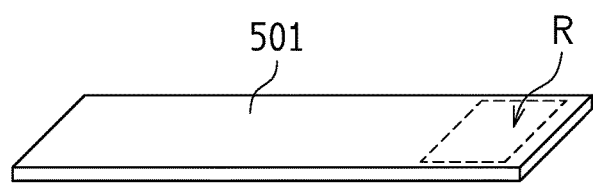
FIG. 7 is a perspective view of a first member of a bonded structure in Working examples.
Figure 8:
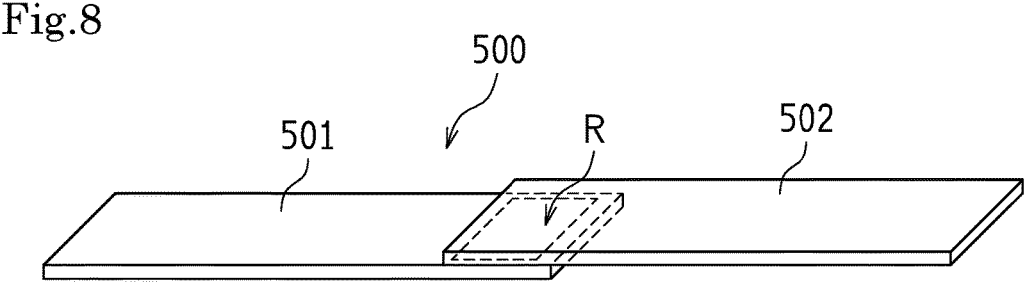
FIG. 8 is a perspective view of the bonded structure in Working examples.

Advantageous effects of the above-mentioned first embodiment were tested by Experimental examples 1 and 2, as described below with reference to FIG. 7 and FIG. 8.

Experimental Example 1

In Experimental example 1, a bonded structure 500 (see FIG. 8) of Working example 1 corresponding to the first embodiment and a bonded structure of Comparative example 1 were prepared and evaluated for their bonding properties. To evaluate the bonding properties, the bonding strength was measured in the samples before and after a thermal shock test, and the samples were judged as pass or fail based on the measurement results. The results are indicated in Table 1.

TABLE 1

|  |  |  | Working example 1 | Comparative example 1 |
|---|---|---|---|---|
| First member |  |  | Al | Al |
| Second member |  |  | PBT | PBT |
| Laser |  |  | with pulse control | no pulse control |
| Bore shape | Opening size R1 (surface diameter) |  | 55 μm | 73 μm |
|  | Opening size R2 (inner diameter) |  | 62 μm | N/A |
|  | Depth |  | 87 μm | 53 μm |
| Bonding properties | Bonding strength (before thermal shock test) | shear directions | 16.8 MPa | 9.4 MPa |
|  |  | peel directions | 1.00 MPa | 0.64 MPa |
|  | Bonding strength (after thermal shock test) | shear directions | 16.0 MPa | 5.1 MPa |
|  |  | peel directions | 0.98 MPa | 0.15 MPa |
|  | Bonding strength retention rate | shear directions | 95% | 54% |
|  |  | peel directions | 98% | 23% |
| Pass/Fail judgment |  |  | pass | fail |

A method for producing the bonded structure 500 of Working example 1 is described first.

In the bonded structure 500 of Working example 1, the material for a first member 501 was aluminum (A5052). As shown in FIG. 7, the first member 501 had a plate-like shape, with a length of 100 mm, a width of 29 mm, and a thickness of 3 mm.

A predetermined region R on the surface of the first member 501 was irradiated with a laser beam. The predetermined region R was a bonding area in the bonded structure 500 and had an area of 12.5 mm×20 mm. For the laser irradiation, the fiber laser marker MX-Z2000 manufactured by OMRON Corporation was employed. The laser irradiation conditions are given below.

<Laser Irradiation Conditions>

Laser: fiber laser (wavelength 1062 nm)

Frequency: 10 kHz

Output: 3.0 W

Scanning speed: 650 mm/sec

Number of scans: 20 times

Irradiation gap: 65 μm

Number of subpulses: 20

In this case, the frequency means that of a pulse composed of a plurality of (20 in this example) subpulses. In other words, under the irradiation conditions given above, a laser beam (a pulse) was emitted 10,000 times at a gap of 65 μm while moving 650 mm per second, and the pulse was composed of 20 subpulses. The number of scans means how many times the same spot was irradiated by the laser beam.

By laser irradiation in which one pulse was composed of a plurality of subpulses, bores were formed at the predetermined region R on the surface of the first member 501, and projecting portions were formed on the surface side of the bores. Namely, in the thus obtained bores, the opening size R2 at the boundary between the diameter-increasing portion and the diameter-decreasing portion (see FIG. 1) was greater than the opening size R1 at the surface (see FIG. 1), as indicated in Table 1.

Then, a second member 502 was bonded to the surface of the first member 501 by insert molding. In the bonded structure 500 of Working example 1, the material for the second member 502 was PBT (DURANEX (Registered Trademark) 3316 manufactured by WinTech Polymer Ltd.). The molding machine was J35EL3 manufactured by The Japan Steel Works, LTD. The molding conditions are given below.

<Molding Conditions>
Predrying: 120° C.×5 hours
Mold temperature: 120° C.
Cylinder temperature: 270° C.
Hold pressure: 100 MPa Under these conditions, the bonded structure 500 of Working example 1 was prepared. The second member 502 had a plate-like shape, with a length of 100 mm, a width of 25 mm, and a thickness of 3 mm.

Next, a method for producing the bonded structure of Comparative example 1 is described below.

In the bonded structure of Comparative example 1, the materials for the first member and the second member were the same as those used in Working example 1, and the same molding conditions were applied. However, in the bonded structure of Comparative example 1, bores were formed with use of a fiber laser without a pulse control function, namely, by laser irradiation in which one pulse was not composed of a plurality of subpulses. Owing to this difference, the bores formed in the first member of Comparative example 1 had a tapered (conical) shape. Specifically, as indicated in Table 1, the first member of Comparative example 1 had neither a projecting portion which protruded inwardly along the inner periphery nor a portion corresponding to the opening size R2 in Working example 1.

The bonded structure 500 of Working example 1 and the bonded structure of Comparative example 1 were evaluated for their bonding properties.

For evaluation, the bonding strength was measured by the electromechanical universal testing system 5900 manufactured by Instron Company Limited. Specifically, the test in the shear directions was conducted at a tension rate of 5 mm/min, and the test in the peel directions (vertical directions) was conducted at an indentation speed of 2 mm/min based on the three-point bending test. The tests were terminated when the second member or the bonding interface broke. The maximum strengths in these tests were taken as the bonding strength.

The thermal shock test was conducted by the thermal shock chamber TSD-100 manufactured by ESPEC CORP. Specifically, a cycle of a 30-minute low-temperature exposure at −40° C. and a 30-minute high-temperature exposure at 85° C. was repeated 100 times.

To determine reliability in the thermal cycling environment, pass/fail judgment was made by the following criteria.

Pass: "bonding strength after the thermal shock test"/ "bonding strength before the thermal shock test"≥90%
Fail: "bonding strength after the thermal shock test"/ "bonding strength before the thermal shock test"<90%

As indicated in Table 1 above, before the thermal shock test, the bonded structure 500 of Working example 1 showed higher bonding strengths in the shear directions and the peel directions than the bonded structure of Comparative example 1. This result proved that formation of the projecting portions along the inner peripheries of the bores, as in the bonded structure 500 of Working example 1, did improve the bonding strengths. Also after the thermal shock test, the bonded structure 500 of Working example 1 showed higher bonding strengths in the shear directions and the peel directions than the bonded structure of Comparative example 1.

It also turned out that the bonded structure 500 of Working example 1 after the thermal shock test could maintain 90% or greater of the bonding strengths before the thermal shock test. In contrast, the bonded structure of Comparative example 1 lost the bonding strengths significantly after the thermal shock test. Hence, formation of the projecting portions along the inner peripheries of the bores, as in the bonded structure 500 of Working example 1, could improve durability in the thermal cycling environment.

Experimental Example 2

In Experimental example 2, a bonded structure of Working example 2 corresponding to the first embodiment and a bonded structure of Comparative example 2 were prepared and evaluated for their bonding properties. The bonding properties were evaluated in the same manner as in Experimental example 1. The results are indicated in Table 2.

TABLE 2

|  |  |  | Working example 2 | Comparative example 2 |
|---|---|---|---|---|
| First member |  |  | PPS | PPS |
| Second member |  |  | PBT | PBT |
| Laser |  |  | with pulse control | no pulse control |
| Bore shape | Opening size R1 (surface diameter) |  | 54 μm | 72 μm |
|  | Opening size R2 (inner diameter) |  | 59 μm | N/A |
|  | Depth |  | 65 μm | 35 μm |
| Bonding properties | Bonding strength (before thermal shock test) | shear directions | 15.4 MPa | 10.2 MPa |
|  |  | peel directions | 0.84 MPa | 0.23 MPa |
|  | Bonding strength (after thermal shock test) | shear directions | 14.7 MPa | 4.1 MPa |
|  |  | peel directions | 0.81 MPa | 0.07 MPa |
|  | Bonding strength retention rate | shear directions | 95% | 40% |
|  |  | peel directions | 96% | 30% |
| Pass/Fail judgment |  |  | pass | fail |

In Experimental example 2, the material for the first member and the laser irradiation conditions were changed from those in Experimental example 1. Specifically, in the bonded structure of Working example 2, the material for the first member was PPS (FORTRON® 1140 manufactured by Polyplastics Co., Ltd.). The laser irradiation conditions are given below.

<Laser Irradiation Conditions>
Laser: fiber laser (wavelength 1062 nm)
Frequency: 10 kHz
Output: 1.1 W
Scanning speed: 650 mm/sec
Number of scans: 3 times
Irradiation gap: 65 μm
Number of subpulses: 3

As indicated in Table 2 above, before the thermal shock test, the bonded structure of Working example 2 showed higher bonding strengths in the shear directions and the peel directions than the bonded structure of Comparative example 2. It also turned out that the bonded structure of Working example 2 after the thermal shock test could maintain 90% or greater of the bonding strengths before the thermal shock test. Namely, the results in Experimental example 2 were similar to those in Experimental example 1. Thus, in the case where the material for the first member was a resin material PPS, it was also possible to improve not only the bonding strengths but also the durability in the thermal cycling environment by forming the projecting portions in the bores.

Second Embodiment

Next, a bonded structure 200 according to the second embodiment of the present invention is described with reference to FIG. 9.

Figure 9:
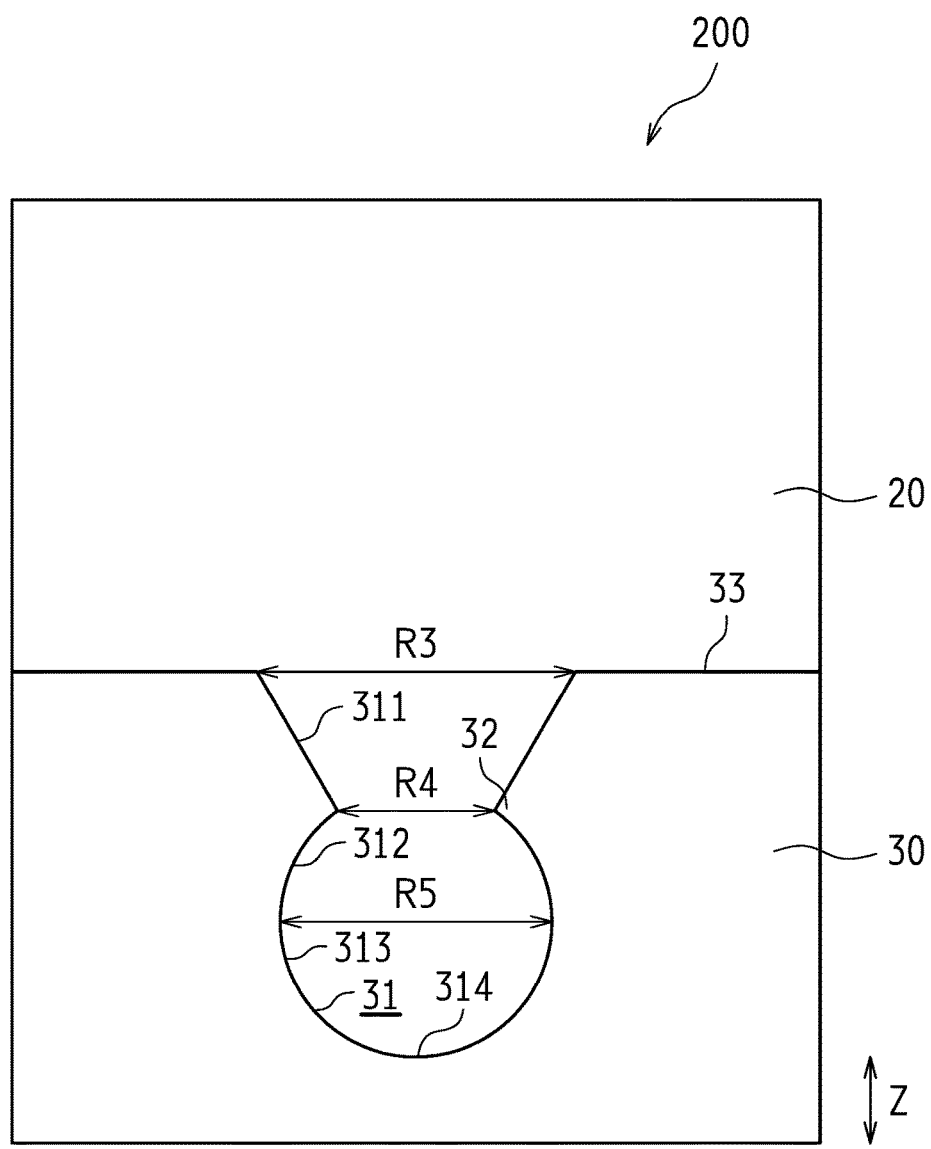
FIG. 9 is a schematic cross-sectional view of a bonded structure according to a second embodiment of the present invention.

As shown in FIG. 9, the bonded structure 200 is made of a first member 30 and a second member 20 which are composed of dissimilar materials and bonded to each other. A bore 31 having an opening is formed in a surface 33 of the first member 30. A projecting portion 32 is formed along an inner periphery of the bore 31 in an inwardly protruding manner. A second member 20 is filled in the bore 31 of the first member 30 and solidified therein.

In the second embodiment, each of the bores 31 is defined, in a continuous manner, by a diameter-decreasing portion 311 whose opening size decreases in a depth direction (a Z direction) from a surface 33 side toward a bottom 314, a diameter-increasing portion 312 whose opening size increases in the depth direction from the surface 33 side toward the bottom 314, and a diameter-decreasing portion 313 whose opening size decreases in the depth direction from the surface 33 side toward the bottom 314. The diameter-decreasing portion 311 narrows linearly. The diameter-increasing portion 312 expands in a curved manner. The diameter-decreasing portion 313 narrows in a curved manner. The diameter-decreasing portion 311 is an example of "a second diameter-decreasing portion" in the present invention, and the diameter-decreasing portion 313 is an example of "a first diameter-decreasing portion" in the present invention.

The diameter-decreasing portion 311, the diameter-increasing portion 312, and the diameter-decreasing portion 313 are arranged in this order from the surface 33 side toward the bottom 314. Namely, the diameter-decreasing portion 311 is arranged closer to the surface 33 than the diameter-increasing portion 312. In the thus configured bore 31, an opening size (an inner diameter) R4 at a boundary between the diameter-decreasing portion 311 and the diameter-increasing portion 312 is smaller than an opening size R3 at the surface 33 and an opening size R5 at a boundary between the diameter-increasing portion 312 and the diameter-decreasing portion 313. Namely, in the depth direction in each bore 31, a portion where the diameter-decreasing portion 311 meets the diameter-increasing portion 312 serves as the projecting portion 32. In other words, the diameter-decreasing portion 311 and the diameter-increasing portion 312 constitute the projecting portion 32. In this arrangement, the apex of the projecting portion 32 lies deeper in the bore 31, closer to the bottom 314. The projecting portion 32 is formed, for example, annularly along an entire periphery of each bore 31.

Except for the above arrangements, the first member 30 is configured in the same manner as the first member 10 described above.

The projecting portion 32 (the diameter-increasing portion 312) which protrudes inwardly along the inner periphery of the bore 31 is engageable in peel directions (Z directions) with the second member 20 filled in the bore 31, so that the bonding strength in the peel directions can be improved. This configuration can improve the bonding strength not only in the shear directions but also in the peel directions. Besides, in a thermal cycling environment, the bonding strength can be maintained even if peel stress is generated due to a difference in coefficient of linear expansion between the first member 30 and the second member 20. Thus, it is possible to improve durability in the thermal cycling environment.

—Method for Producing the Bonded Structure—

Figure 10:
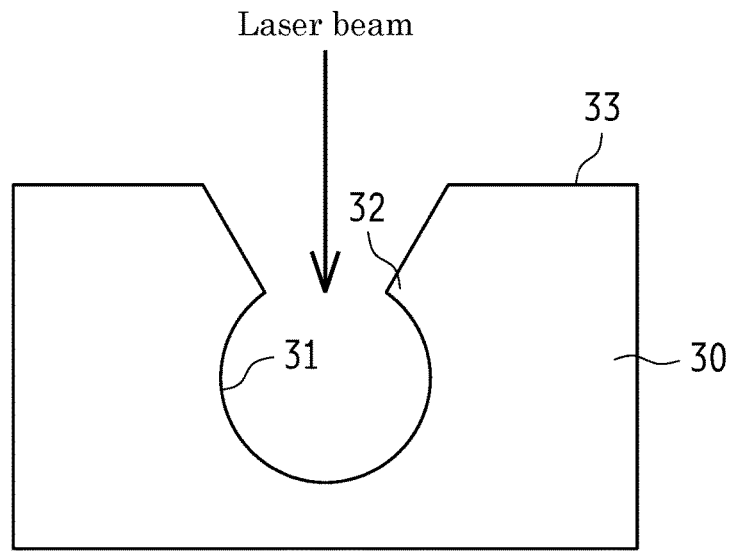
FIG. 10 is a schematic view of the bonded structure shown in FIG. 9, with a bore formed in a first member.

Next, a method for producing the bonded structure 200 according to the second embodiment is described with reference to FIG. 9 and FIG. 10.

To start with, the bores 31 are formed in the surface 33 of the first member 30, and the projecting portions 32 are formed along the inner peripheries of the bores 31. The bores 31 and the projecting portions 32 are formed by laser irradiation in which one pulse is composed of a plurality of subpulses, for example, as shown in FIG. 10. As a specific example, the bores 31 and the projecting portions 32 are formed by means of the fiber laser marker MX-Z2000 or MX-Z2050 mentioned above. Unlike the first embodiment, the projecting portions 32 in the second embodiment are arranged deeper in the bores 31, closer to the bottoms 314. This difference results from, for example, differences in material for the first member 30, laser irradiation conditions, and the like.

Thereafter, the second member 20 is filled into the bores 31 of the first member 30 and is solidified therein. By this process, the first member 30 and the second member 20 are bonded to each other to provide a bonded structure 200 (see FIG. 9). The second member 20 is bonded, for example, by injection molding, hot-plate welding, laser welding, cast curing, ultrasonic welding, or vibration welding.

—Modified Examples of the First Member—

Modified examples of the first member 30 are described with reference to FIG. 11 to FIG. 14.

Figure 11:
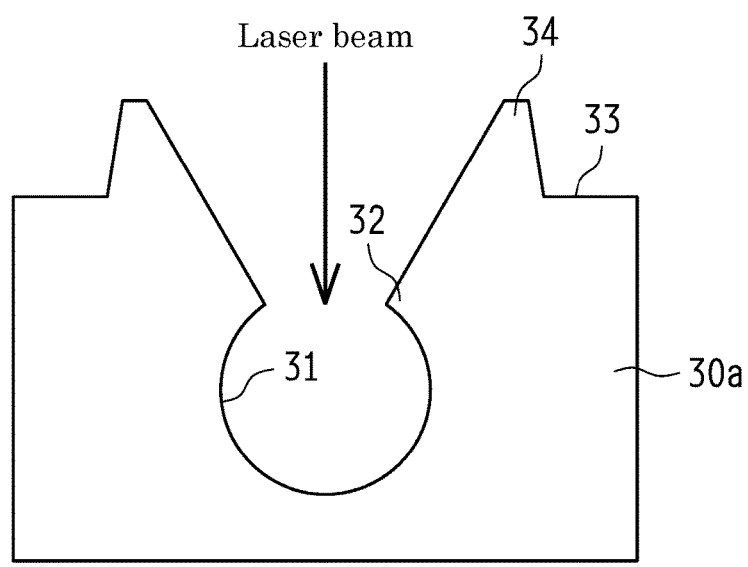
FIG. 11 is a schematic view of a first member in a first modified example of the second embodiment.

FIG. 11 is a schematic view of a first member 30a in a first modified example of the second embodiment. As shown in FIG. 11, the first member 30a may have a rib 34 rising upwardly from the surface 33 around the opening of each bore 31. The rib 34 surrounds the periphery of the bore 31, and has an approximately circular shape in plan view. When the first member 30a is irradiated with a laser beam in which one pulse is composed of a plurality of subpulses, the rib 34 is formed, for example, by deposition of the molten first member 30a. The rib 34 gives an additional anchor effect, and the resulting structure can improve the bonding strength further.

Figure 12:
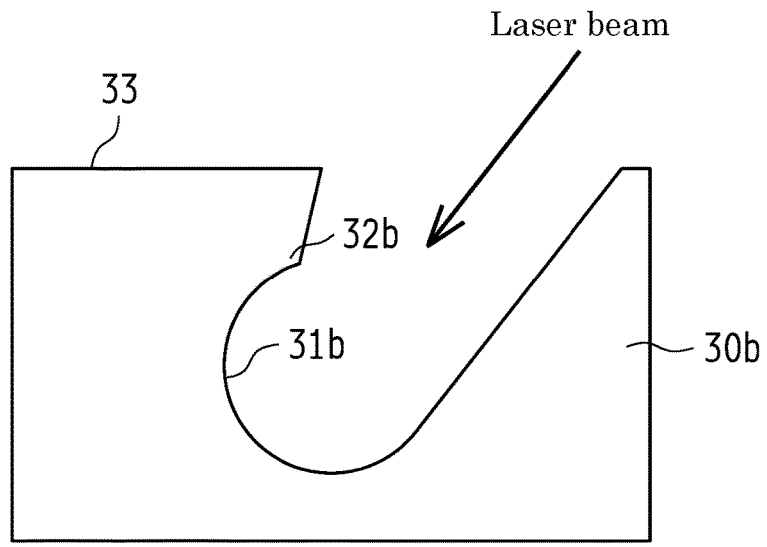
FIG. 12 is a schematic view of a first member in a second modified example of the second embodiment.

FIG. 12 is a schematic view of a first member 30b in a second modified example of the second embodiment. As shown in FIG. 12, the axis of each bore 31b in the first member 30b may be formed so as to incline to the surface 33. A projecting portion 32b which protrudes inwardly is formed along the inner periphery of the bore 31b. For example, to form the bore 31b, the laser irradiation direction is adjusted obliquely (by not less than 45° and not more than 90°) to the surface 33. Even if laser irradiation is obstructed by an object above the formation area of the bore 31b, this arrangement enables formation of the bore 31b.

Figure 13:
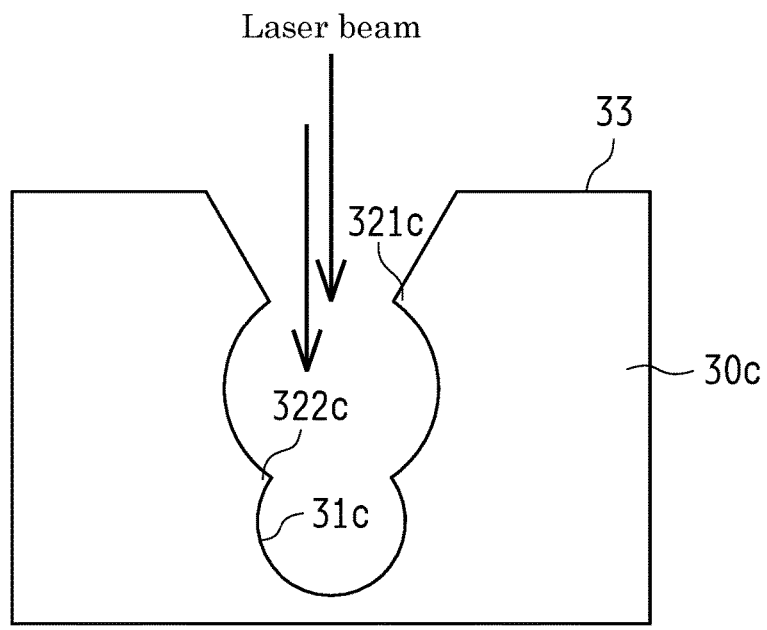
FIG. 13 is a schematic view of a first member in a third modified example of the second embodiment.

FIG. 13 is a schematic view of a first member 30c in a third modified example of the second embodiment. As shown in FIG. 13, the first member 30c may have a plurality of projecting portions 321c and 322c in each bore 31c. Namely, a set of the diameter-increasing portion and the diameter-decreasing portion are formed in a continuous manner as described above, and one or more additional sets of the diameter-increasing portion and the diameter-decreasing portion may be formed in the depth direction. The bore 31c can be formed, for example, by irradiating the same spot while changing the laser output conditions. This arrangement increases the surface area of the bore 31c and provides the plurality of projecting portions 321c and 322c, thereby improving the bonding strength to a greater extent. The example in FIG. 13 employs two projecting portions 321c and 322c, but there may be three or more projecting portions.

Figure 14:
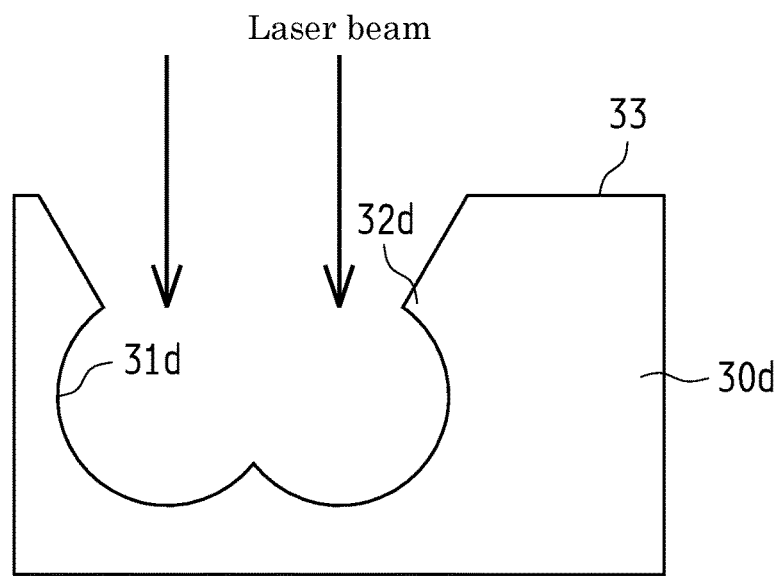
FIG. 14 is a schematic view of a first member in a fourth modified example of the second embodiment.

FIG. 14 is a schematic view of a first member 30d in a fourth modified example of the second embodiment. As shown in FIG. 14, a bore 31d in the first member 30d may be formed by more than one laser irradiation at different spots. Namely, bores formed by the laser irradiation are partially overlapped to constitute the bore 31d. A projecting portion 32d which protrudes inwardly is formed along the inner periphery of the bore 31d.

These first to fourth modified examples may be combined as required.

Experimental Example

Advantageous effects of the above-mentioned second embodiment were tested by Experimental example 3, as described below.

In Experimental example 3, a bonded structure of Working example 3 corresponding to the second embodiment and a bonded structure of Comparative example 3 were prepared and evaluated for their bonding properties. The bonding properties were evaluated in the same manner as in Experimental example 1. The results are indicated in Table 3.

In Experimental example 3, the material for the first member and the laser irradiation conditions were changed from those in Experimental example 1. Specifically, in the bonded structure of Working example 3, the material for the first member was SUS304. The laser irradiation conditions are given below.

<Laser Irradiation Conditions>
Laser: fiber laser (wavelength 1062 nm)
Frequency: 10 kHz
Output: 3.8 W
Scanning speed: 650 mm/sec
Number of scans: 20 times
Irradiation gap: 65 μm
Number of subpulses: 20

By laser irradiation in which one pulse was composed of a plurality of subpulses, bores were formed in the surface of the first member, and projecting portions were formed deeper in the bores, away from the surface. Namely, as indicated in Table 3, the opening size R4 (see FIG. 9) was smaller than the opening size R3 at the surface (see FIG. 9) and the opening size R5 (see FIG. 9). In comparison, the bores formed in the first member of Comparative example 3 had a tapered (conical) shape, without any equivalent to the opening sizes R4 and R5 in Working example 3.

As indicated in Table 3 above, before the thermal shock test, the bonded structure of Working example 3 showed higher bonding strengths in the shear directions and the peel directions than the bonded structure of Comparative example 3. It also turned out that the bonded structure of Working example 3 after the thermal shock test could maintain 90% or greater of the bonding strengths before the thermal shock test. Namely, the results in Experimental example 3 were similar to those in Experimental example 1. Thus, in the case where the projecting portions were arranged deeper in the bores and closer to the bottom, it was also possible to improve not only the bonding strengths but also the durability in the thermal cycling environment.

—Gap Between the Bores—

Experimental example 3-1 was conducted in order to determine a preferable range of the gap between adjacent bores (the center-to-center distance).

In Experimental example 3-1, bonded structures of Working examples 3-1 to 3-3 and bonded structures of Reference examples 3-1 and 3-2 were prepared and evaluated for their bonding properties. The bonding properties were evaluated in the same manner as in Experimental example 1. The results are indicated in Table 4.

TABLE 3

| | | | Working example 3 | Comparative example 3 |
|---|---|---|---|---|
| First member | | | SUS | SUS |
| Second member | | | PBT | PBT |
| Laser | | | with pulse control | no pulse control |
| Bore shape | Opening size R3 (surface diameter) | | 54 μm | 66 μm |
| | Opening size R4 (inner diameter) | | 47 μm | N/A |
| | Opening size R5 (inner diameter) | | 56 μm | N/A |
| | Depth | | 49 μm | 32 μm |
| Bonding properties | Bonding strength (before thermal shock test) | shear directions | 19.0 MPa | 8.6 MPa |
| | | peel directions | 0.66 MPa | 0.23 MPa |
| | Bonding strength (after thermal shock test) | shear directions | 17.9 MPa | 4.6 MPa |
| | | peel directions | 0.63 MPa | 0.11 MPa |
| | Bonding strength retention rate | shear directions | 94% | 53% |
| | | peel directions | 95% | 48% |
| Pass/Fail judgment | | | pass | fail |

TABLE 4

|  |  | Working examples | | | Reference examples | |
|---|---|---|---|---|---|---|
|  |  | 3-1 | 3-2 | 3-3 | 3-1 | 3-2 |
| First member | | | | SUS | | |
| Second member | | | | PBT | | |
| Laser | | | | with pulse control | | |
| Irradiation gap | | 54 μm | 65 μm | 200 μm | 30 μm | 250 μm |
| Bore shape | Opening size R3 (surface diameter) | 54 μm | 55 μm | 56 μm | N/A | 55 μm |
|  | Opening size R4 (inner diameter) | 42 μm | 43 μm | 42 μm | N/A | 41 μm |
|  | Opening size R5 (inner diameter) | 57 μm | 59 μm | 58 μm | N/A | 58 μm |
|  | Depth | 55 μm | 53 μm | 54 μm | N/A | 51 μm |
| Bonding properties | Bonding strength (before thermal shock test) shear directions | 18.6 MPa | 18.7 MPa | 13.7 MPa | 16.7 MPa | 11.3 MPa |
|  | peel directions | 0.72 MPa | 0.67 MPa | 0.46 MPa | 0.47 MPa | 0.32 MPa |
|  | Bonding strength (after thermal shock test) shear directions | 17.7 MPa | 17.7 MPa | 12.7 MPa | 12.7 MPa | 8.3 MPa |
|  | peel directions | 0.68 MPa | 0.61 MPa | 0.43 MPa | 0.31 MPa | 0.18 MPa |
|  | Bonding strength retention rate shear directions | 95% | 95% | 93% | 76% | 73% |
|  | peel directions | 94% | 91% | 93% | 66% | 56% |
| Pass/Fail judgment | | pass | pass | pass | fail | fail |

In Experimental example 3-1, the gap of laser irradiation positions was changed among the samples by changing the scanning speed while keeping the frequency constant (10 kHz). In Working examples 3-1 to 3-3 and Reference example 3-2, the gap of laser irradiation positions was a gap between the bores (a center-to-center distance). On the other hand, in Reference example 3-1, the gap of laser irradiation positions was so small that the bores were overlapped like a groove. As indicated in Table 4, the gaps between the bores were 54 μm in Working example 3-1, 65 μm in Working example 3-2, 200 μm in Working example 3-3, and 250 μm in Reference example 3-2. The common laser irradiation conditions, as given below, were applied to these bonded structures.

<Laser Irradiation Conditions>
Laser: fiber laser (wavelength 1062 nm)
Frequency: 10 kHz
Output: 3.8 W
Number of scans: 20 times
Number of subpulses: 20

As indicated in Table 4 above, the bonded structures in Working examples 3-1 to 3-3 after the thermal shock test could maintain 90% or greater of the bonding strengths before the thermal shock test. On the other hand, in the bonded structures of Reference examples 3-1 and 3-2, the bonding strength retention rates after the thermal shock test were lower than 90%. Therefore, the gap between the adjacent bores should be a distance which prevents overlapping and merging of the bores, and is preferably 200 μm or less. Incidentally, the bonded structure in Working example 3-3, which had fewer bores than the bonded structures in Working examples 3-1 and 3-2, showed lower bonding strengths but could ensure durability in the thermal cycling environment.

—Opening Size at the Surface of the Bore—

Experimental example 3-2 was conducted in order to determine a preferable range of the opening size R3 at the surface of the bore.

In Experimental example 3-2, bonded structures of Working examples 3-4 to 3-6 and bonded structures of Reference examples 3-3 and 3-4 were prepared and evaluated for their bonding properties. The bonding properties were evaluated in the same manner as in Experimental example 1. The results are indicated in Table 5.

TABLE 5

|  |  | Working examples | | | Reference examples | |
|---|---|---|---|---|---|---|
|  |  | 3-4 | 3-5 | 3-6 | 3-3 | 3-4 |
| First member | | | | SUS | | |
| Second member | | | | PBT | | |
| Laser | | | with pulse control | | | N/A |
| Conditions | Number of subpulses | 24 | 20 | 10 | 30 | N/A |
|  | Number of scans | 35 times | 20 times | 15 times | 50 times | 10 times |
| Bore shape | Opening size R3 (surface diameter) | 30 μm | 58 μm | 100 μm | 28 μm | 120 μm |
|  | Opening size R4 (inner diameter) | 28 μm | 48 μm | 75 μm | 22 μm | N/A |
|  | Opening size R5 (inner diameter) | 42 μm | 65 μm | 90 μm | 47 μm | N/A |
|  | Depth | 240 μm | 64 μm | 45 μm | 340 μm | 28 μm |
| Bonding properties | Bonding strength (before thermal shock test) shear directions | 12.0 MPa | 13.4 MPa | 11.3 MPa | 5.0 MPa | 4.5 MPa |
|  | peel directions | 0.41 MPa | 0.53 MPa | 0.45 MPa | 0.26 MPa | 0.15 MPa |
|  | Bonding strength (after thermal shock test) shear directions | 11.0 MPa | 12.3 MPa | 10.4 MPa | 2.1 MPa | 1.4 MPa |
|  | peel directions | 0.38 MPa | 0.48 MPa | 0.41 MPa | 0.07 MPa | 0.02 MPa |
|  | Bonding strength retention rate shear directions | 92% | 92% | 92% | 42% | 31% |
|  | peel directions | 93% | 91% | 91% | 27% | 13% |
| Pass/Fail judgment | | pass | pass | pass | fail | fail |

In Experimental example 3-2, the opening size R3 at the surface of the bore was changed among the samples by changing the laser irradiation conditions. In Reference example 3-4, the bores had a tapered shape. As indicated in Table 5, the opening sizes R3 were 30 μm in Working example 3-4, 58 μm in Working example 3-5, and 100 μm in Working example 3-6. As for Reference examples 3-3 and 3-4, the opening sizes R3 were 28 μm and 120 μm, respectively. The common laser irradiation conditions, as given below, were applied to these bonded structures.

<Laser Irradiation Conditions>
Laser: fiber laser (wavelength 1062 nm)
Frequency: 10 kHz
Output: 3.8 W
Scanning speed: 1200 mm/sec
Irradiation gap: 120 μm As indicated in Table 5 above, the bonded structures in Working examples 3-4 to 3-6 after the thermal shock test could maintain 90% or greater of the bonding strengths before the thermal shock test. On the other hand, in the bonded structures of Reference examples 3-3 and 3-4, the bonding strength retention rates after the thermal shock test were lower than 90%. Therefore, the opening size R3 at the surface of each bore is preferably between 30 μm and 100 μm. Incidentally, the bonded structures in Working examples 3-4 to 3-6, which had fewer bores than the bonded structures in Working examples 3-1 and 3-2, showed lower bonding strengths but could ensure durability in the thermal cycling environment.

—Bore Depth—

Experimental example 3-3 was conducted in order to determine a preferable range of the bore depth.

In Experimental example 3-3, bonded structures of Working examples 3-7 to 3-9 and bonded structures of Reference examples 3-5 and 3-6 were prepared and evaluated for their bonding properties. The bonding properties were evaluated in the same manner as in Experimental example 1. The results are indicated in Table 6.

In Experimental example 3-3, the depth of the bores was changed among the samples by changing the laser irradiation conditions. In Reference example 3-5, the bores had a tapered shape. As indicated in Table 6, the depths were 30 μm in Working example 3-7, 60 μm in Working example 3-8, and 300 μm in Working example 3-9. As for Reference examples 3-5 and 3-6, the depths were 24 μm and 340 μm, respectively. The common laser irradiation conditions, as given below, were applied to these bonded structures.

<Laser Irradiation Conditions>
Laser: fiber laser (wavelength 1062 nm)
Frequency: 10 kHz
Output: 3.8 W
Scanning speed: 650 mm/sec
Irradiation gap: 65 μm As indicated in Table 6 above, the bonded structures in Working examples 3-7 to 3-9 after the thermal shock test could maintain 90% or greater of the bonding strengths before the thermal shock test. On the other hand, in the bonded structures of Reference examples 3-5 and 3-6, the bonding strength retention rates after the thermal shock test were lower than 90%. Therefore, the depth of each bore 11 is preferably between 30 μm and 300 μm.

Third Embodiment

The following description focuses on a bonded structure according to the third embodiment of the present invention. In the third embodiment, at least either of the formation of the bores or the bonding of the first member and the second member is carried out in an inert gas atmosphere or a reduced-pressure atmosphere.

In the bonded structure according to the third embodiment, the first member is a metal, and the second member is a thermoplastic resin or a thermosetting resin which transmits a laser beam. Except for this difference, the bonded structure in the third embodiment is similar to the bonded structure in the first or the second embodiment described above.

—Method for Producing the Bonded Structure—

Next, a method for producing the bonded structure according to the third embodiment is described with reference to FIG. 15 to FIG. 18.

In the third embodiment, the step for forming the bores in the surface of the metal first member by laser irradiation is carried out in an inert gas atmosphere or a reduced-pressure

TABLE 6

|   |   |   | Working examples | | | Reference examples | |
|---|---|---|---|---|---|---|---|
|   |   |   | 3-7 | 3-8 | 3-9 | 3-5 | 3-6 |
| First member |   |   | | | SUS | | |
| Second member |   |   | | | PBT | | |
| Laser |   |   | | | with pulse control | | |
| Conditions | Number of subpulses |   | 14 | 20 | 30 | 10 | 30 |
|   | Number of scans |   | 7 times | 20 times | 40 times | 5 times | 50 times |
| Bore shape | Opening size R3 (surface diameter) |   | 63 μm | 58 μm | 35 μm | 63 μm | 28 μm |
|   | Opening size R4 (inner diameter) |   | 54 μm | 46 μm | 31 μm | N/A | 22 μm |
|   | Opening size R5 (inner diameter) |   | 59 μm | 62 μm | 45 μm | N/A | 47 μm |
|   | Depth |   | 30 μm | 60 μm | 300 μm | 24 μm | 340 μm |
| Bonding | Bonding strength | shear directions | 13.0 MPa | 16.3 MPa | 16.9 MPa | 8.0 MPa | 11.8 MPa |
| properties | (before thermal shock test) | peel directions | 0.45 MPa | 0.59 MPa | 0.63 MPa | 0.21 MPa | 0.32 MPa |
|   | Bonding strength | shear directions | 11.8 MPa | 15.3 MPa | 16.1 MPa | 3.2 MPa | 8.0 MPa |
|   | (after thermal shock test) | peel directions | 0.41 MPa | 0.55 MPa | 0.60 MPa | 0.05 MPa | 0.23 MPa |
|   | Bonding strength | shear directions | 91% | 94% | 95% | 40% | 68% |
|   | retention rate | peel directions | 91% | 93% | 95% | 24% | 72% |
| Pass/Fail judgment |   |   | pass | pass | pass | fail | fail | atmosphere. This arrangement can prevent excessive formation of an oxide film on the surface of the first member by laser irradiation, thereby further improving durability in the thermal cycling environment.

Figure 15:
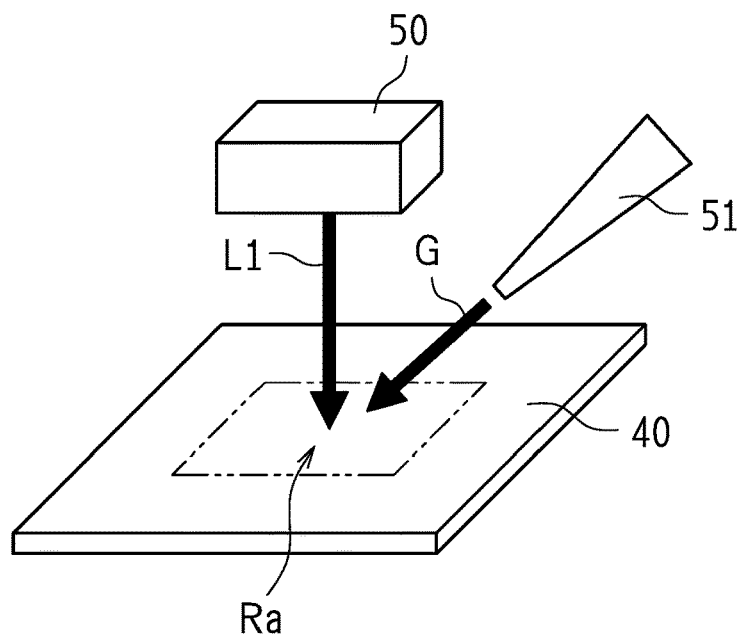
FIG. 15 is a schematic illustration for describing a method for producing the bonded structure according to a third embodiment of the present invention, wherein an inert gas is ejected from an injection nozzle while bores are formed in the first member.

For example, as shown in FIG. 15, when a laser beam L1 is emitted from a head 50 of the laser marker onto a bore formation region Ra in a metal first member 40, an inert gas G is ejected from an injection nozzle 51 toward the bore formation region Ra, and thereby bores (not shown) are formed in the first member 40 in an inert gas atmosphere. Examples of the inert gas G include nitrogen gas, carbon dioxide gas ($CO_2$ gas), argon gas, helium gas, and the like. The inert gas G is ejected, for example, in an amount of 2 L/min.

The temperature of the inert gas G ejected from the injection nozzle 51 may be controllable. If a great amount of inert gas G is ejected (e.g. 50 L/min), the surface of the first member 40 is cooled so much that processing characteristics by the laser beam L1 may be adversely affected. Adjustment of the temperature of the inert gas G suppresses deterioration in processing characteristics in the case where an inert gas is ejected in a great amount.

Figure 16:
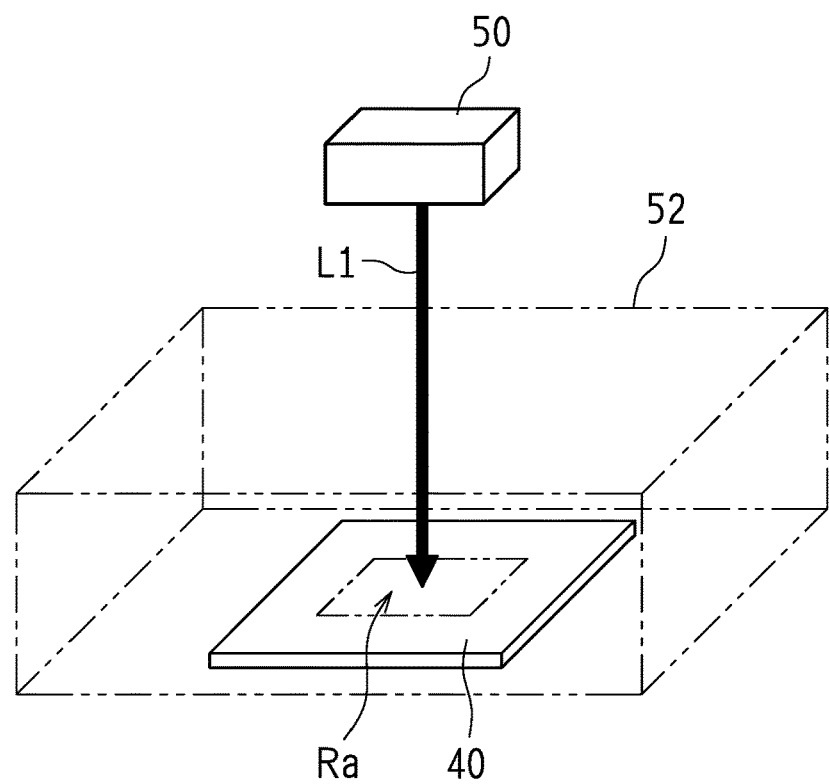
FIG. 16 is a schematic illustration for describing the method for producing the bonded structure according to the third embodiment of the present invention, wherein the first member is placed in a chamber, and the chamber is kept in an inert gas atmosphere while bore are formed in the first member.

Further as shown in FIG. 16, the metal first member 40 may be placed in a chamber 52, and thereafter an inert gas atmosphere may be created in this chamber 52. In this inert gas atmosphere, the laser beam L1 is emitted from the head 50 of the laser marker to the bore formation region Ra in the first member 40. The chamber 52 is, for example, an acrylic transparent sealed container, equipped with an inlet port (not shown) and a discharge port (not shown) for an inert gas. In this arrangement, an inert gas is not sprayed directly onto the surface of the first member 40, and does not cool the surface so much as to deteriorate processing characteristics.

Figure 17:
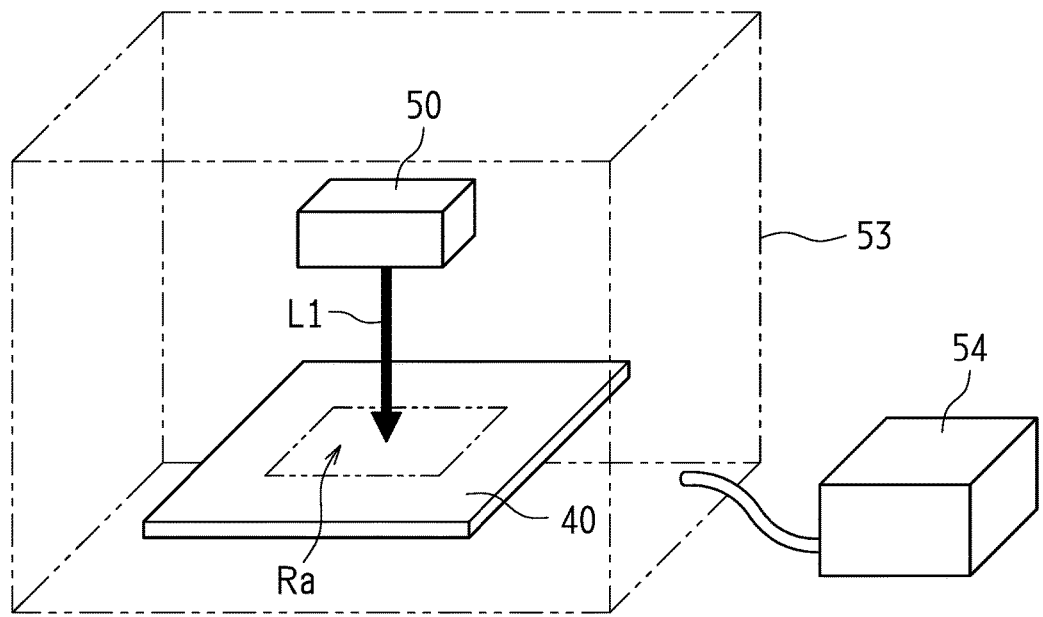
FIG. 17 is a schematic illustration for describing the method for producing the bonded structure according to the third embodiment of the present invention, wherein the first member is placed in a chamber, and the chamber is kept in a reduced-pressure atmosphere while bore are formed in the first member.

Further as shown in FIG. 17, the metal first member 40 and the head 50 of the laser marker may be placed in a chamber 53, and thereafter a reduced-pressure atmosphere is created in this chamber 53 by evacuating the inside by a vacuum pump 54. In this reduced-pressure atmosphere, the laser beam L1 is emitted from the head 50 to the bore formation region Ra in the first member 40. The depressurization condition is, for example, 500 mm/Hg (666.6 hPa) or lower. The reduced-pressure atmosphere may be created from the air atmosphere, or may be created after an inert gas is charged into the chamber 53. In the latter case, oxidation of the first member 40 can be suppressed more securely. The chamber 53 is, for example, a pressure-resistant sealed container.

The laser beam L1, in which one pulse is composed of a plurality of subpulses, is emitted by, for example, the fiber laser marker MX-Z2000 or MX-Z2050 mentioned above. Hence, just as in the first and the second embodiments, bores are formed in the first member 40, and projecting portions (not shown) are formed along the inner peripheries of the bores.

Further in the third embodiment, the step for bonding the first member and the second member by stacking the first member and the second member and emitting a laser beam from the second member side toward the surface of the first member is carried out in an inert gas atmosphere or a reduced-pressure atmosphere. This arrangement can prevent excessive formation of an oxide film on the surface of the first member by laser irradiation, thereby further improving durability in the thermal cycling environment.

Figure 18:
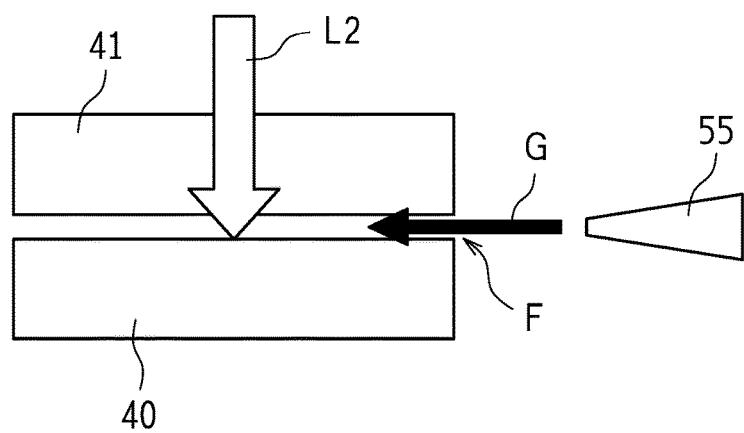
FIG. 18 is a schematic illustration for describing the method for producing the bonded structure according to the third embodiment of the present invention, wherein an inert gas is ejected from an injection nozzle while the first member and the second member are bonded.

For example, as shown in FIG. 18, when a laser beam L2 for bonding is emitted from a second member 41 side toward the surface of the first member 40, an inert gas G is ejected from an injection nozzle 55 toward a contact interface F between the first member 40 and the second member 41, and thereby the first member 40 and the second member 41 are bonded in an inert gas atmosphere. To be specific, the second member 41 is filled into the bores of the first member 40 and is solidified therein. In FIG. 18, a minute space at the contact interface F between the first member 40 and the second member 41 is shown schematically on an enlarged scale.

The laser beam L2 for bonding is emitted, for example, by a semiconductor laser. Instead of spraying an inert gas G onto the contact interface F between the first member 40 and the second member 41, the first member 40 and the second member 41 may be bonded by irradiation of the laser beam L2 inside a chamber in an inert gas atmosphere or a reduced-pressure atmosphere.

As described above, an inert gas atmosphere or a reduced-pressure atmosphere may be applied both in the step for forming the bores and in the step for bonding the first member and the second member. Alternatively, an inert gas atmosphere or a reduced-pressure atmosphere may be applied either in the step for forming the bores or in the step for bonding the first member and the second member. It should be noted that the temperature of the first member gets higher in the step for forming the bores than in the step for bonding the first member and the second member. Hence, a greater preventive effect against formation of an oxide film is expected if an inert gas atmosphere or a reduced-pressure atmosphere is applied in the step for forming the bores, rather than in the step for bonding the first member and the second member.

Experimental Example

Advantageous effects of the above-mentioned third embodiment were tested by Experimental example 4, as described below.

In Experimental example 4, a bonded structure of Reference example and bonded structures of Working examples 4 to 11 were prepared and evaluated for their resistance in the thermal shock test. The results are indicated in Table 7. The bonded structures in Working examples 4 to 11 corresponded to the third embodiment, whereas the bonded structure in Reference example did not correspond to the third embodiment. Additionally, Working examples 4 to 11 and Reference example corresponded to the first or the second embodiment, in which the bores were formed in the first member and the projecting portions were formed along the inner peripheries of the bores, as described later.

TABLE 7

|  | Processing atmosphere | Bonding atmosphere | Resistance in thermal shock test (cycles) |
|---|---|---|---|
| Reference example | air | air | 250 |
| Working example 4 | inert gas | air | 750 |
| Working example 5 | reduced pressure | air | 500 |
| Working example 6 | air | inert gas | 500 |
| Working example 7 | air | reduced pressure | 500 |
| Working example 8 | inert gas | inert gas | 1000 |
| Working example 9 | inert gas | reduced pressure | 750 |
| Working example 10 | reduced pressure | inert gas | 750 |
| Working example 11 | reduced pressure | reduced pressure | 500 |

A method for producing the bonded structure of Reference example is described first.

In the bonded structure of Reference example, the material for the first member was tough-pitch copper (C1100). The first member had a plate-like shape, with a length of 100 mm, a width of 29 mm, and a thickness of 0.5 mm.

A predetermined region on the surface of the first member was irradiated with a laser beam for processing. The predetermined region was a bonding area in the bonded structure and had an area of 12.5 mm×20 mm. For the laser irradiation, the fiber laser marker MX-Z2000 manufactured by OMRON Corporation was employed. The laser irradiation conditions for processing are given below. In Reference example, laser irradiation for processing was carried out in an air atmosphere, where neither inert gas ejection nor depressurization was conducted.

<Laser Irradiation Conditions for Processing>
Laser: fiber laser (wavelength 1062 nm)
Frequency: 10 kHz
Output: 3.8 W
Scanning speed: 650 mm/sec
Number of scans: 40 times
Irradiation gap: 65 μm
Number of subpulses: 20

By laser irradiation in which one pulse was composed of a plurality of subpulses, bores were formed at the predetermined region in the surface of the first member, and projecting portions were formed along the inner peripheries of the bores.

Thereafter, a second member was layered on the predetermined region in the first member. The material for the second member was PMMA (ACRYLITE® manufactured by Mitsubishi Rayon Co., Ltd.). The second member had a plate-like shape, with a length of 100 mm, a width of 25 mm, and a thickness of 3 mm.

The predetermined region in the first member was irradiated from the second member side with a laser beam for bonding. The laser irradiation conditions for bonding are given below. In Reference example, laser irradiation for bonding was carried out in an air atmosphere.

<Laser Irradiation Conditions for Bonding>
Laser: semiconductor laser (wavelength 808 nm)
Oscillation mode: continuous oscillation
Output: 30 W
Focal diameter: 4 mm
Scanning speed: 1 mm/sec
Contact pressure: 0.6 MPa By laser irradiation under the above conditions, the first member was heated, and its heat caused the second member to melt. The molten second member was filled into the bores and solidified therein, so that the first member and the second member were bonded to each other.

The bonded structure of Reference example was prepared in the above-mentioned manner.

Next, methods for producing the bonded structures of Working examples 4 to 11 are described.

In Working example 4, as indicated in Table 7 above, the laser irradiation for processing was carried out while an inert gas was ejected toward the predetermined region in the first member. As the inert gas, nitrogen gas was ejected at a flow rate of 2 L/min. Namely, bores were formed in the first member in an inert gas atmosphere. Except for this difference, Working example 4 was similar to Reference example.

In Working example 5, the laser irradiation for processing was carried out in a reduced-pressure atmosphere. Namely, bores were formed in the first member in a reduced-pressure atmosphere. Except for this difference, Working example 5 was similar to Reference example.

In Working example 6, the laser irradiation for bonding was carried out while an inert gas (nitrogen gas) was ejected toward the contact interface between the first member and the second member. Namely, the first member and the second member were bonded in an inert gas atmosphere. Except for this difference, Working example 6 was similar to Reference example.

In Working example 7, the laser beam irradiation for bonding was carried out in a reduced-pressure atmosphere. Namely, the first member and the second member were bonded in a reduced-pressure atmosphere. Except for this difference, Working example 7 was similar to Reference example.

In Working example 8, bores were formed in the first member in an inert gas atmosphere, and the first member and the second member were bonded in an inert gas atmosphere. Except for this difference, Working example 8 was similar to Reference example.

In Working example 9, bores were formed in the first member in an inert gas atmosphere, and the first member and the second member were bonded in a reduced-pressure atmosphere. Except for this difference, Working example 9 was similar to Reference example.

In Working example 10, bores were formed in the first member in a reduced-pressure atmosphere, and the first member and the second member were bonded in an inert gas atmosphere. Except for this difference, Working example 10 was similar to Reference example.

In Working example 11, bores were formed in the first member in a reduced-pressure atmosphere, and the first member and the second member were bonded in a reduced-pressure atmosphere. Except for this difference, Working example 11 was similar to Reference example.

The bonded structures obtained in Working examples 4 to 11 and Reference example were evaluated for their resistance in the thermal shock test. The thermal shock test was conducted by the thermal shock chamber TSD-100 manufactured by ESPEC CORP. Specifically, a cycle of a 30-minute low-temperature exposure at −40° C. and a 30-minute high-temperature exposure at 85° C. was repeated. After 100, 250, 500, 750, 1000, and 1500 cycles, the bonded structures were checked whether their bonding interface had been delaminated.

As indicated in Table 7 above, in the bonded structure of Reference example, delamination of the bonding interface was not observed after 250 cycles, but was confirmed after 500 cycles. Namely, the bonded structure of Reference example was resistant to the thermal shock test at least until 250 cycles.

On the other hand, the bonded structures of Working examples 5 to 7 and 11 were resistant to the thermal shock test at least until 500 cycles. The bonded structures of Working examples 4, 9 and 10 were resistant to the thermal shock test at least until 750 cycles. The bonded structure of Working example 8 was resistant to the thermal shock test at least until 1000 cycles.

Thus, in comparison with Reference example, Working examples 4 to 11 could improve the resistance in the thermal shock test. This is probably because formation of an oxide film on the surface of the first member could be prevented by conducting either of the processing step or the bonding step in an inert gas atmosphere or a reduced-pressure atmosphere.

As evident from the results of Working examples 4 and 6, wherein either the processing step or the bonding step was conducted in an inert gas atmosphere, the resistance in the thermal shock test was higher in the case where the processing step was conducted in an inert gas atmosphere. Further, comparison between the results in Working examples 4 and 5 and the results in Working examples 8 and 11 indicated that the resistance in the thermal shock test was higher in the case of an inert gas atmosphere than in the case of a reduced-pressure atmosphere.

Other Embodiments

The embodiments disclosed herein are considered in all respects as illustrative and do not constitute any ground for restrictive interpretation. Therefore, the technological scope of the invention is indicated by the appended claims rather than by the foregoing embodiments alone. All variations and modifications falling within the equivalency range of the appended claims are intended to be embraced in the technological scope of the invention.

For example, in the first embodiment, the surface 13 may be flat or curved. The same applies to the second embodiment.

In the first embodiment, the diameter-increasing portion 111 and the diameter-decreasing portion 112 are formed in a continuous manner, which is merely an example and should not be restrictive. Alternatively, the diameter-increasing portion and the diameter-decreasing portion may be connected by a straight portion extending in the depth direction. The same applies to the second embodiment.

In the third embodiment, the first member 40 and the second member 41 are bonded by irradiation of the laser beam L2 for bonding, which is merely an example and should not be restrictive. Alternatively, the first member and the second member may be bonded by hot press molding. The hot press molding process may be carried out while an inert gas is sprayed from an injection nozzle onto the bonding interface between the first member and the second member, or may be carried out in a chamber kept in an inert gas atmosphere or a reduced-pressure atmosphere. As another alternative, the first member and the second member may be bonded by insert molding. In this case, an inert gas may be ejected after the first member is placed in a mold and until the mold is clamped. In the case of hot press molding or insert molding, the second member does not necessarily have to transmit a laser beam.

INDUSTRIAL APPLICABILITY

The present invention is applicable to a bonded structure made of a first member and a second member which are composed of dissimilar materials. The present invention is also applicable to a method for producing the bonded structure.

REFERENCE SIGNS LIST 10, 10a, 10b, 10c, 10d, 40 first member
11, 11b, 11c, 11d bore
12, 12b, 121c, 122c, 12d projecting portion
13 surface
14 rib
20, 41 second member
30, 30a, 30b, 30c, 30d first member
31, 31b, 31c, 31d bore
32, 32b, 321c, 322c, 32d projecting portion
33 surface
34 rib
100 bonded structure
111 diameter-increasing portion
112 diameter-decreasing portion (first diameter-decreasing portion)
113 bottom
200 bonded structure
311 diameter-decreasing portion (second diameter-decreasing portion)
312 diameter-increasing portion
313 diameter-decreasing portion (first diameter-decreasing portion)
314 bottom

The invention claimed is:

1. A bonded structure comprising a first member and a second member which are bonded to each other,
wherein a plurality of bores each having an opening are formed in a surface of the first member,
wherein the second member is filled in the bores of the first member,
wherein each of the plurality of bores includes a diameter-increasing portion whose opening size increases in a depth direction from a surface side toward a bottom of the first member, and a first diameter-decreasing portion whose opening size decreases in the depth direction from the surface side toward the bottom,
wherein, in each of the bores, the diameter-increasing portion is formed on the surface side, and the first diameter-decreasing portion is formed on a bottom side,
wherein a gap between centers of adjacent bores of the plurality of bores is 200 μm or less,
wherein each of the plurality of bores has an opening size of 30 μm to 100 μm at the surface and a depth of 30 μm to 300 μm,
wherein the plurality of bores are formed in the surface of the first member as blind holes having a circular shape in plan view,
wherein the gap is equal to or greater than the opening size of the plurality of bores at the surface,
wherein the first member is a metal and the second member is a thermoplastic resin or a thermosetting resin, and
wherein the second member fills the plurality of bores of the first member and is solidified therein in an inert gas atmosphere or a reduced-pressure atmosphere.

2. The bonded structure according to claim 1,
wherein each of the plurality of bores further includes by a second diameter-decreasing portion whose opening size decreases in the depth direction from the surface side toward the bottom, and
wherein the second diameter-decreasing portion is formed on the surface side relative to the diameter-increasing portion.

3. The bonded structure according to claim 1,
wherein a rib is provided around the opening of each of the plurality of bores in an upwardly rising manner from the surface.

4. The bonded structure according to claim 1,
wherein an axis of each of the plurality of bores is formed so as to incline to the surface.

5. The bonded structure according to claim 1,
wherein the diameter-increasing portion and the first diameter-decreasing portion of each of the plurality of bores are formed as a set in a continuous manner, and
wherein a plurality of sets of the diameter-increasing portion and the first diameter-decreasing portion are formed in the depth direction.

6. A method for producing a bonded structure comprising a first member and a second member which are bonded to each other, the method comprising:
a step of forming a plurality of bores each having an opening in a surface of the first member; and
a step of filling the second member in the plurality of bores of the first member and solidifying the second member therein in an inert gas atmosphere or a reduced-pressure atmosphere,
wherein each of the plurality of bores includes a diameter-increasing portion whose opening size increases in a depth direction from a surface side toward a bottom of the first member, and a first diameter-decreasing portion whose opening size decreases in the depth direction from the surface side toward the bottom,
wherein, in each of the plurality of bores, the diameter-increasing portion is formed on the surface side, and the first diameter-decreasing portion is formed on a bottom side,
wherein a gap between centers of adjacent bores of the plurality of bores is 200 μm or less,
wherein each of the plurality of bores has an opening size of 30 μm to 100 μm at the surface and a depth of 30 μm to 300 μm,
wherein the plurality of bores are formed in the surface of the first member as blind holes having a circular shape in plan view,
wherein the gap is equal to or greater than the opening size of the plurality of bores at the surface, and
wherein the first member is a metal and the second member is a thermoplastic resin or a thermosetting resin.

7. The method for producing the bonded structure according to claim 6,
wherein the step of forming the plurality of bores comprises forming the plurality of bores by laser irradiation to the surface of the first member in an inert gas atmosphere or a reduced-pressure atmosphere.

* * * * *